United States Patent
Mochizuki

(10) Patent No.: US 7,145,616 B2
(45) Date of Patent: Dec. 5, 2006

(54) TRANSFLECTIVE LIQUID CRYSTAL DEVICE

(75) Inventor: Akihiro Mochizuki, Louisville, CO (US)

(73) Assignee: Nano Loa, Inc., Kanagawa (JP)

(*) Notice: Subject to any disclaimer, the term of this patent is extended or adjusted under 35 U.S.C. 154(b) by 0 days.

(21) Appl. No.: 10/928,005

(22) Filed: Aug. 27, 2004

(65) Prior Publication Data

US 2006/0044492 A1 Mar. 2, 2006

(51) Int. Cl.
*G02F 1/1335* (2006.01)
*G02F 1/141* (2006.01)

(52) U.S. Cl. ........................... 349/114; 349/133
(58) Field of Classification Search ......... 349/114, 349/133
See application file for complete search history.

(56) References Cited

U.S. PATENT DOCUMENTS

| 4,448,823 | A | * | 5/1984 | Clifford | 428/1.31 |
| 5,113,273 | A | * | 5/1992 | Mochizuki et al. | 349/85 |
| 5,150,236 | A | * | 9/1992 | Patel | 349/198 |
| 6,747,723 | B1 | * | 6/2004 | Hanakawa et al. | 349/147 |
| 6,958,796 | B1 | * | 10/2005 | Takizawa | 349/114 |
| 6,977,700 | B1 | * | 12/2005 | Uesaka et al. | 349/114 |

* cited by examiner

*Primary Examiner*—Toan Ton
(74) *Attorney, Agent, or Firm*—Morrison & Foerster LLP

(57) ABSTRACT

A transflective-type liquid crystal display device, comprising, at least, a pair of substrates, and a liquid crystal material disposed between the pair of substrates. The liquid crystal material is a polarization-shielded smectic liquid crystal material capable of providing a tunable birefringence system wherein the magnitude of anisotropy of the refractive index of the liquid crystal layer can be regulated by the intensity of an applied electric field.

8 Claims, 20 Drawing Sheets

TRANSFLECTIVE LIQUID CRYSTAL DEVICE

BACKGROUND OF THE INVENTION

1. Field of the Invention

The present invention relates to a transflective-type liquid crystal display device.

2. Related Background Art

Along with the development of infrastructure such as wireless or radio transmission, in the field of small-size portable equipment, in addition to the conventional so-called "standalone equipment", there have been demanded some functions such as functions as network connection equipment including Internet connection, and functions as high-quality and high-image quality portable or mobile terminal equipment, for example, for receiving television signals. Particularly, by virtue of simplicity in the communication performance and portability, portable phones (cellular phones) have expanded their applications from applications of conventional mere portable telephones to applications in many fields in daily life such as terminals for settlement in merchandise purchase and terminals for a person to go through the automatic ticket gate in railroads.

A significant increase in utilization time has led to a necessity for portable terminals, which have begun to be used in such extensive applications, to stand up for significant issues. Such issues are a requirement for high image quality and a problem of power consumption. Display of television images is also possible from the viewpoint of infrastructure of communication, but on the other hand, the necessary number of display pixels is much larger, and the brightness is higher, as compared with conventional displays for cellular phones. Further, while high definition display and high brightness display are required, in the case of portable terminals of which the premise is battery operation, a higher level of power saving is required.

In order to satisfy the above contradictory function requirements and to utilize advanced communication infrastructure which is being established, a novel display system which can simultaneously satisfy high image quality and power saving should be rapidly established.

Attempts to satisfy such requirements have already been made, and a certain stage of function can be provided. This is a liquid crystal display (LCD) known as the so-called "transflective" or "semi-transmissive display."

In the case of the portable terminals which are in many cases used outdoors, in an environment with strong external light, when ambient light is utilized for use as reflective display, power consumption in the backlight for the display can be saved. Particularly, in the high image quality display LCDs, there is a tendency that the utilization efficiency of backlight generally decreases with increasing the number of pixels, and display which does not use backlight has great significance for power saving.

On the other hand, in the use of LCDs during evening hours or in the indoor use, it is also necessary to impart satisfactory brightness to the display by using the backlight. In the transflective-type LCDs, optimal image quality can always be selected depending upon illuminance environment used in this way, and, at the same time, power consumption can be reduced to a small value. Therefore, the transflective-type LCD can be the to be an ideal display as a display device for high-performance portable terminals. In this connection, in the case of a light-emitting display, very bright display can be provided under dark illuminance environment. On the other hand, under environment of illuminance like outdoor environment of fine weather, the brightness becomes relatively insufficient. In order to provide a higher level of brightness, for example, an additional function is necessary wherein illuminance of environment is detected and the brightness is automatically enhanced.

Transflective LCDs can provide ideal display as the above display for high-performance portable terminals, but on the other hand, they have the following problems remaining unsolved.

That is, in the same display panel, transflective-type LCDs, as indicated by its name, should be used as transmissive LCD or reflective LCD depending upon illuminance of environment. In general, LCD is of the so-called "birefringence control type" which controls the polarization of light. Accordingly, in the determination of optical characteristics, the retardation, that is, the product ($\Delta n \times d$) of the anisotropy of refractive index of a liquid crystal material as an optical medium ($\Delta n$) and the optical path length of light which is incident to LCD and finally exits from LCD (d) should be a given value. In general, in a conventional liquid crystal display system represented by TN, $\Delta n$ is specified as a material constant of a liquid crystal material. Therefore, the setting of the retardation is mainly designed by the optical path length, that is, by the cell gap of a liquid crystal display panel. The optical design of LCD is most fundamentally conducted so that, for a center wavelength 560 nm (green) of visible light, the value of $\Delta n \times d$ is $\pi/2$. For example, when the $\Delta n$ value of the liquid crystal material used is 0.07, in order to maximize the utilization efficiency of light (backlight or external environment light), the value of "d" satisfying $(0.07 \times d)/0.56 \mu m$ (560 nm)=1/2, that is, 4 μm, should be selected.

Herein, care should be taken to a difference in the optical path length between transmissive LCD and reflective LCD. FIGS. 1(a) and FIG. 1(b) schematically show the optical path length of the transmissive LCD and the optical path length of the reflective LCD, respectively. As can be seen from FIGS. 1(a) and FIG. 1(b), the optical path length of the reflective LCD is twice that of the transmissive LCD. That is, it is found that, in the transmissive LCD, light emitted from backlight is passed through the liquid crystal material layer only once, whereas, in the reflective LCD, light introduced from the outside is passed through the liquid crystal material layer twice to provide an optical path length of $\Delta n \times 2d$.

A so-called "one pixel-two cell gap" system has been devised as a method of overcoming the problem of the optical path length in the transflective-type LCD. FIG. 2 is a schematic view showing the one pixel-two cell gap system. As shown in FIG. 2, the retardation for both transmission and reflection is satisfied by a method wherein one pixel is divided into at least two parts and the cell gap in one pixel is set to "d" for transmission while the cell gap in the other pixel is set to d/2. This method is very effective for effectively satisfying both the transmissive display and the reflective display. On the other hand, however, two cell gaps should be built in one pixel. This poses a very serious problem in the production of LCDs for portable terminals where high-definition high-density display is generally required. Particularly, as described above, in the high-definition display is required to provide a high-image quality display such as TV image display in the future, a further reduction in pixel size and an increase in the resolution are necessary. This further makes it difficult to produce such satisfactory LCDs.

Thus, in such a situation that the development of a small-size high-definition display is required more than ever before, not only a high-image quality display and a low-power consumption display, but also a high-performance high-definition display with satisfactorily high productivity is demanded.

SUMMARY OF THE INVENTION

An object of the present invention is to provide a transflective-type liquid crystal display device which can overcome the above problem encountered in the prior art.

Another object of the present invention is to provide a transflective-type liquid crystal display device that can provide transflective display which basically enables excellent display performance and power saving display.

As a result of earnest study, the present inventor has found that, it is very effective in attaining the above object to halve the birefringent index by controlling the voltage so as to halve the optical thickness, instead of disposing a mirror at a reflection site for a transflective-type liquid crystal display device to halve the optical thickness thereof as in the case of the conventional transflective-type liquid crystal display device.

The transflective-type liquid crystal display device according to the present invention is based on the above discovery. More specifically, such a liquid crystal display device comprises: at least, a pair of substrates, and a liquid crystal material disposed between the pair of substrates; wherein the liquid crystal material is a polarization-shielded smectic liquid crystal material capable of providing a tunable birefringence system wherein the magnitude of anisotropy of the refractive index of the liquid crystal layer can be regulated by the intensity of an electric field to be applied to the liquid crystal layer.

In the transflective-type liquid crystal display device according to the present invention having the above constitution, in order to markedly improve the productivity of the transflective display which basically enables excellent display performance and power saving display, one pixel-two cell gap system, which is very complicated and difficult to be controlled, can be eliminated, and a display system, which can satisfactorily function as a transflective display in a one pixel-one cell gap system, even as in the conventional LCD, and has a high productivity, can be provided. Further, in the present invention, a high-definition, high-density display can be provided at lower power consumption by using a one pixel-one cell gap system.

Hereinbelow, the mechanism of the liquid crystal display in the device according to the present invention will be described.

More specifically, in order to maximize the utilization efficiency of light in one cell gap for different optical path length necessary for the transmissive LCD and the reflective LCD, specifically two-fold (as compared with the transmissive LCD) optical path length necessary for the reflective LCD, a physically acceptable solution is only one, that is, to satisfy a requirement that, when the cell gap of the transmissive LCD is "d", the anisotropy of refractive index (Δn) of a liquid crystal material in the reflective LCD is brought to (Δn)/2. In order to satisfy this requirement, the anisotropy of the refractive index of the liquid crystal layer to be used should be Δn for the transmission mode and (Δn)/2 for the reflection mode.

As shown in FIGS. 1 and 2, for the purpose of saving the power in backlight under bright ambient conditions, the transflective-type LCD has hitherto been utilized. In this device, in a dark place, the backlight is transmitted straight through a thickness of "d", while, in a light place, the reflected light is utilized and is transmitted through a thickness of 2d (FIG. 1). Thus, a place having a thickness of "d" and a place having a thickness of 2d are provided within one pixel. More specifically, the device structure as shown in FIG. 2 is known. That is, in the conventional device, a mirror has been disposed at a place where the reflection of light is necessary so as to halve the optical thickness.

On the other hand, in the conventional LCD represented by TN-LCD, since the anisotropy of the refractive index of the liquid crystal material to be used is defined as the material constant of the liquid crystal material per se, the method which is conceivable to be effective for maximizing the utilization efficiency of light has been only to provide cell gaps suitable for the respective transmission type and reflection type. There have been a display system called "tunable birefringence system" wherein a nematic liquid crystal material is aligned in the so-called "hybrid" orientation and the magnitude of the birefringence is continuously controlled by the intensity of an electric field to be applied thereto.

In this system, since the magnitude of the birefringence of the liquid crystal material layer can be continuously changed depending upon the intensity of the electric field to be applied thereto, there is a possibility that this system can attain the object of the present invention. This tunable birefringence system, however, is such that the control range of the anisotropy of the refractive index is so wide that the performance thereof is exhibited by bringing the incident linear polarized light to elliptical polarized light so as to perform coloring. That is, in this system, the color development without using any color filter is intended by taking advantage of such a phenomenon that the control range of the anisotropy of the refractive index by the intensity of applied electric field significantly deviates from the above-described requirement, i.e., a half of the center wavelength of visible light. On the other hand, in the conventional tunable birefringence system, the control of birefringence in a range necessary for the transflective display by the intensity of the applied electric field cannot be provided. Accordingly, there have been a need to establish a system which basically exhibits the anisotropy of the refractive index depending upon the intensity of electric field as with the conventional tunable birefringence system and, in addition, the control range of the anisotropy of the refractive index is within one-fourth of the center wavelength of visible light.

As described above, in the conventional tunable birefringence system and TN-LCD system, on-off operation of light and the color development are carried out in such a manner that, for the incident linear polarized light, the direction of polarization is varied by continuously varying the direction of alignment of the liquid crystal material molecules, or that the linear polarized light is converted to elliptical polarized light which then exits therefrom. On the other hand, the present inventor has drawn attention to a polarization-shielded smectic liquid crystal display developed by the present inventors and has succeeded in controlling the anisotropy of the refractive index which depends upon the intensity of an applied electric field. This has led to the completion of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Hereinbelow, the present invention will be described in detail with reference to the accompanying drawings, as desired. In the following description, "%" and "part(s)" representing a quantitative proportion or ratio are those based on mass, unless otherwise noted specifically.

(Liquid Crystal Display Device)

The liquid crystal display device according to the present invention includes at least a pair of substrates, and a liquid crystal material disposed between the pair of substrates. In the present invention, the liquid crystal layer is characterized by being a polarization-shielded smectic liquid crystal layer capable of providing a tunable birefringence system wherein the magnitude of anisotropy of the refractive index can be regulated by the intensity of an electric field to be applied to the liquid crystal layer.

(Mechanism of Liquid Crystal Display)

Figure 1:
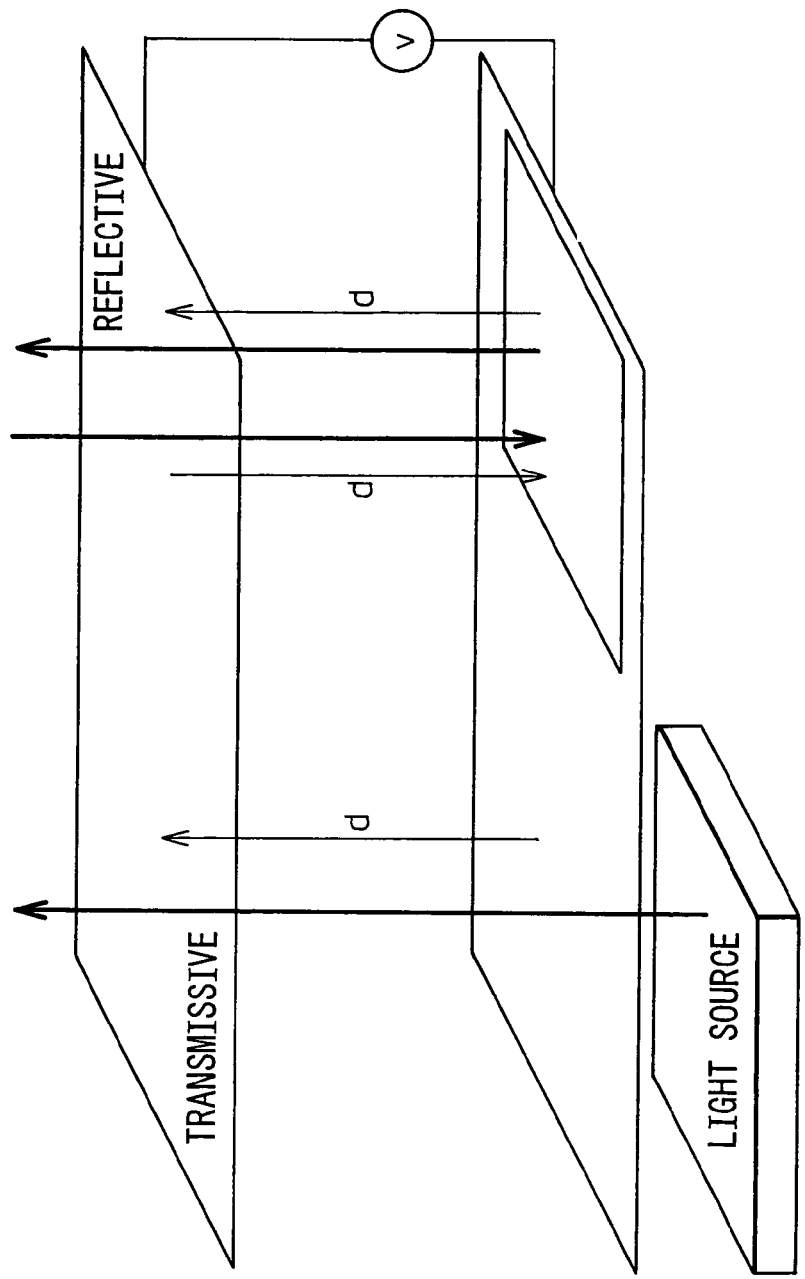
FIG. 1 is a schematic perspective view illustrating the principle of operation of a conventional transflective-type liquid crystal display device.
Figure 2:
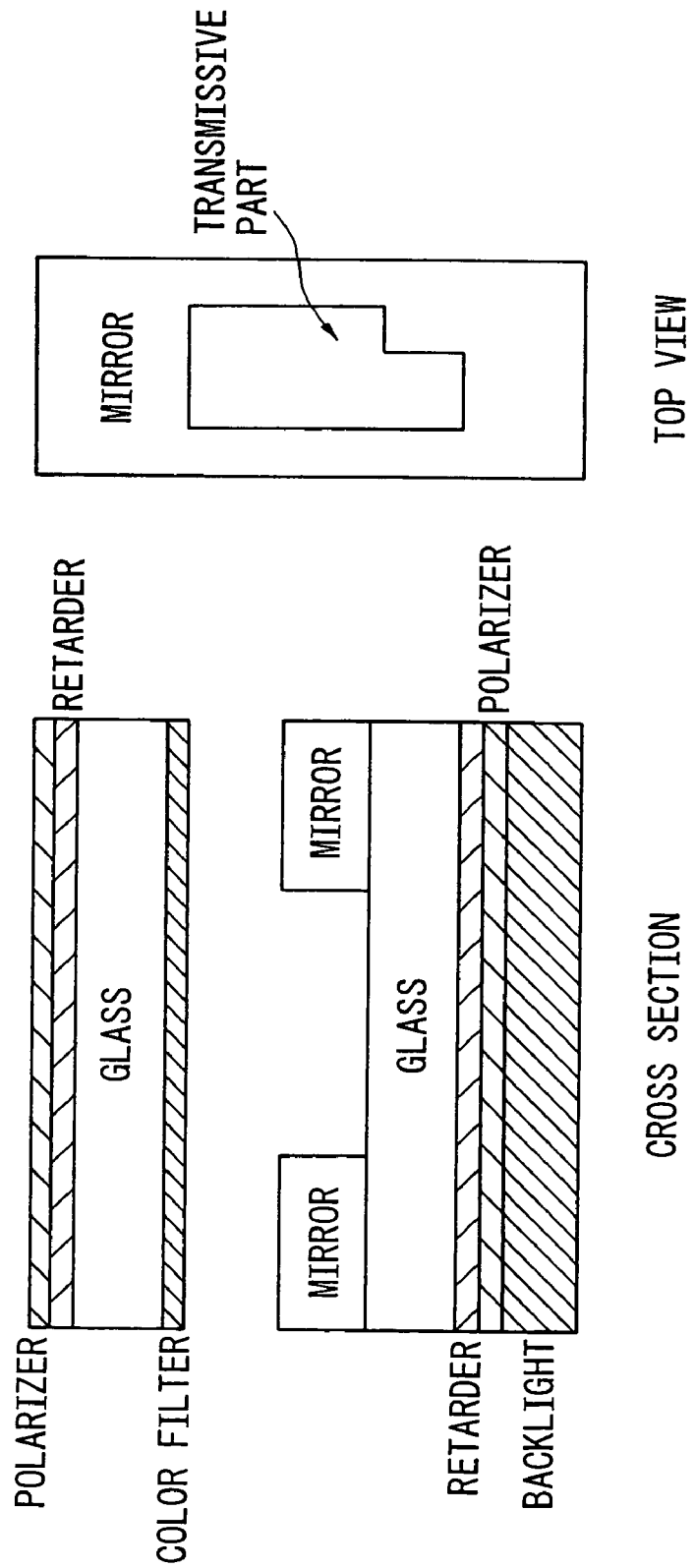
FIG. 2 is a schematic cross-sectional view and a schematic plan view illustrating the structure of a pixel of the conventional transflective-type liquid crystal display device (AM-LCD).
Figure 3:
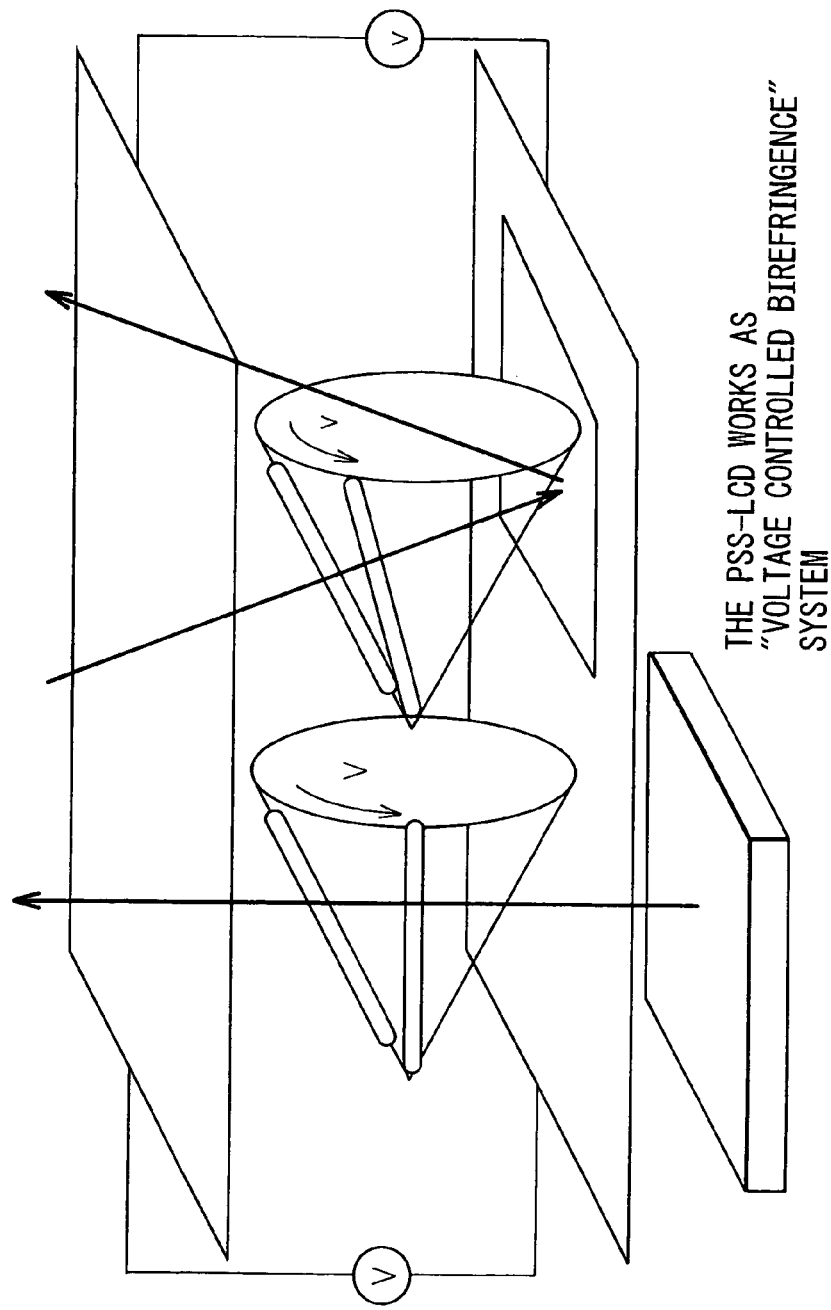
FIG. 3 is a schematic perspective view illustrating one embodiment of the principle of operation (voltage control in the birefringence function of PSS-LCD) of the transflective-type liquid crystal display device according to the present invention.

FIG. 3 shows a change in the retardation of a liquid crystal material panel by the polarization-shielded smectic liquid crystal display according to the present invention.

Referring to FIG. 3, one of features of the polarization-shielded smectic liquid crystal display shown in is that, when a cell gap of the liquid crystal display is fixed, the retardation is changed depending upon the intensity of an applied electric field. Further, as long as the anisotropy of the refractive index ($\Delta n$) possessed by the liquid crystal material layer satisfies the so-called "the first minimum requirement," even when the intensity of the electric field is changed to continuously change the magnitude of the retardation, the wavelength dispersion in the visible light region is negligible and the so-called "chromatic" due to the wavelength dispersion does not occur. As a result, continuous tone display having a high color purity can be provided. Further, as compared with the conventional LCD, the polarization-shielded smectic liquid crystal display has much higher response and a wider view angle. Therefore, if transflective display is possible in a single cell gap, then high-image quality and high-performance display could be provided at a lower production cost than the cost of the conventional display.

(Embodiments of Single Cell Gap)

The principle of the transmissive display and reflective display in the polarization-shielded smectic liquid crystal display in some embodiments of the single cell gap according to the present invention will be explained.

Figure 4:
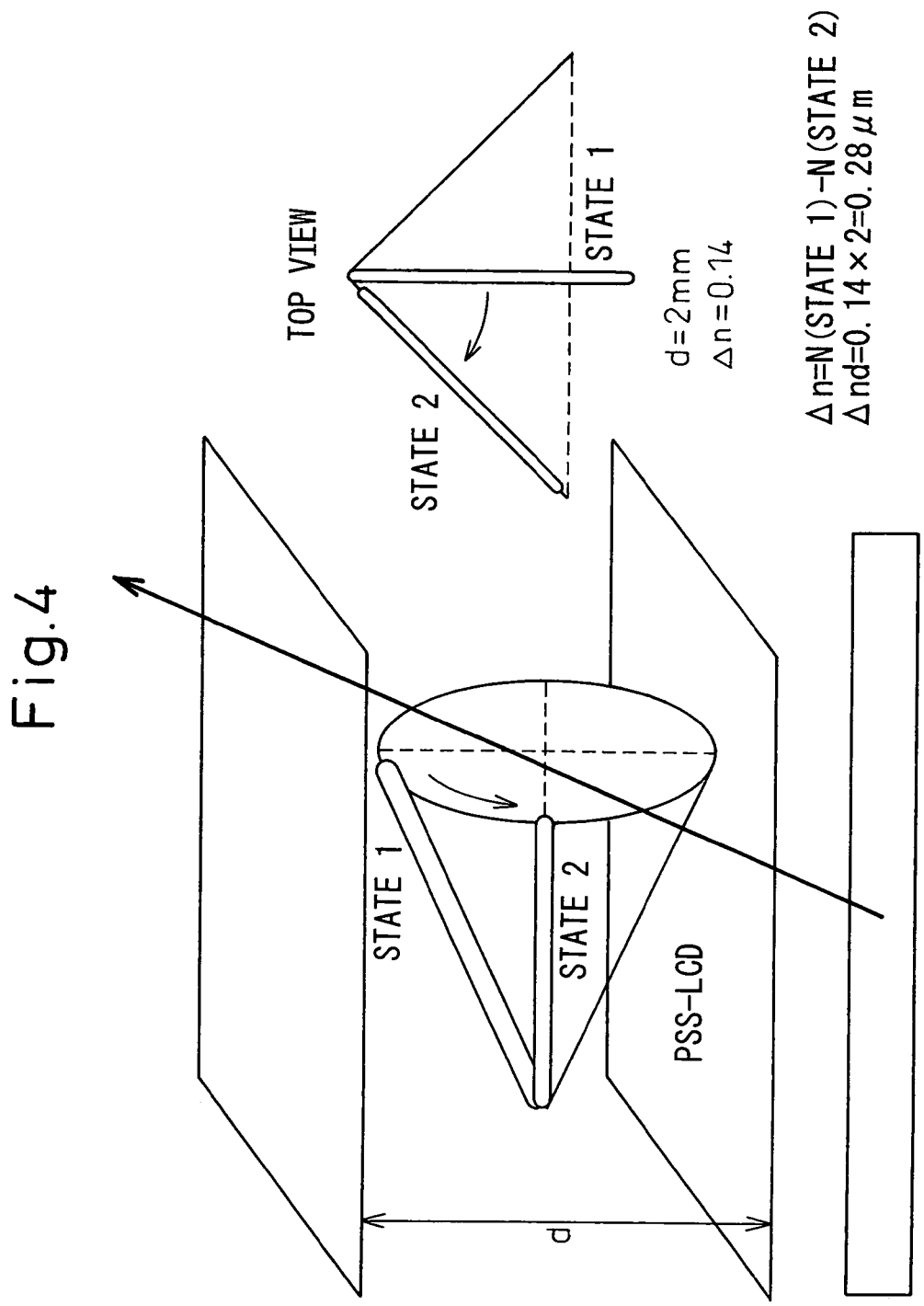
FIG. 4 is a schematic sectional view illustrating one embodiment of the principle of operation (when used as a transmission type) of the transflective-type liquid crystal display device according to the present invention.

Regarding birefringence conditions, the basic display system is assumed to be of a transmission type shown in FIG. 4. Accordingly, Δn (anisotropy of the refractive index) of the schematic smectic liquid crystal material is set to 0.14 in this embodiment. At that time, the first minimum requirement for maximizing the light utilization efficiency is given by equation (1):

$$I = I_0 \sin^2 2\theta \sin^2(\pi \Delta n d/\lambda) \quad (1)$$

Figure 5:
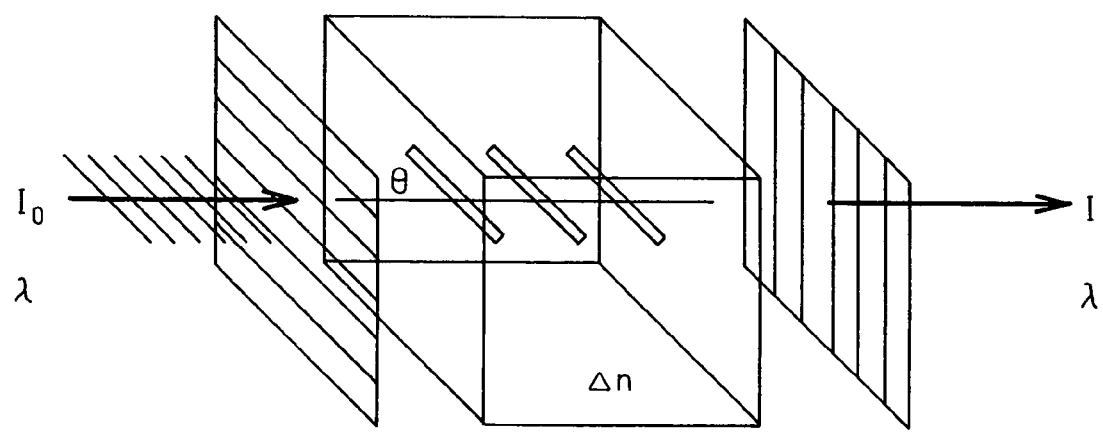
FIG. 5 is a schematic perspective view illustrating one embodiment of the principle of operation of the transflective-type liquid crystal display device according to the present invention.

Regarding parameters in the equation (1), as shown in FIG. 5, I represents the intensity of light which exits through the liquid crystal material layer; $I_0$ represents the intensity of light incident to the liquid crystal material layer; θ represents the angle of incident light to the optical axis of the liquid crystal material molecules; Δn represents the anisotropy of the refractive index of the liquid crystal layer; "d" represents the thickness of the liquid crystal material layer (cell gap); and λ represents the wavelength of incident light (for example, 560 nm which is the center wavelength of visible light is used).

From the equation (1), it is found that the quantity of light, I, which exits from the liquid crystal material panel as the optical material layer can be maximized, that is, the light utilization efficiency can be maximized, by bringing θ to 45 degrees and bringing the value of Δnd/λ to 1/2. It is a matter of course that, when only the mathematical formula is taken into consideration, the value of Δnd/λ may be brought to 3/2, 5/2 or the like. Since, however, these cases corresponding to the minimum requirements other than the first minimum requirement, very high accuracy is required of uniformity of the cell gap. Disadvantageously, this significantly narrows a panel production window and thus possibly renders the panel impractical. At the same time, the cell gap "d" becomes significantly large, leading to a fear of causing a rise in applied voltage.

It is needless to say that, in the equation (1), the term directly involved in the present invention is the part of $\sin^2(\pi \Delta n d/\lambda)$. As described above, in the case of the conventional tunable birefringence system with hybrid alignment, the level of a change in Δn by the applied voltage is so large that Δn disadvantageously significantly does not provide the first minimum requirement (chromatic condition). On the other hand, for the polarization-shielded smectic liquid crystal display according to the present invention, since Δn is substantially changed by the applied voltage, the equation (1) can be rewritten as the equation (2).

$$I = I_0 \sin^2 2\theta \sin^2(\pi \Delta n(E) d/\lambda) \quad (2)$$

In the equation (2), Δn(E) indicates that the anisotropy of the refractive index (Δn) of the liquid crystal layer is a function of the electric field strength E applied to the liquid crystal material layer. In general, there is a possibility that a specific range exits for the range of an applied electric field strength and the range of the anisotropy of the refractive index of the liquid crystal material layer, which is changed depending upon the electric field strength, wherein the equation (2) is established.

When the object of the present invention is taken into consideration, the applied electric field strength which renders the equation (2) effective ranges from an applied electric field strength of zero to a maximum applied electric field strength in the case where the polarization-shielded smectic liquid crystal display is used as transmissive display, and the maximum range of Δn which is changed depending upon the applied electric field strength is Δn (E: max)=Δn (max).

Based on the above assumption, the principle of the present invention will be explained in more detail.

(Principle of the Invention)

Figure 6:
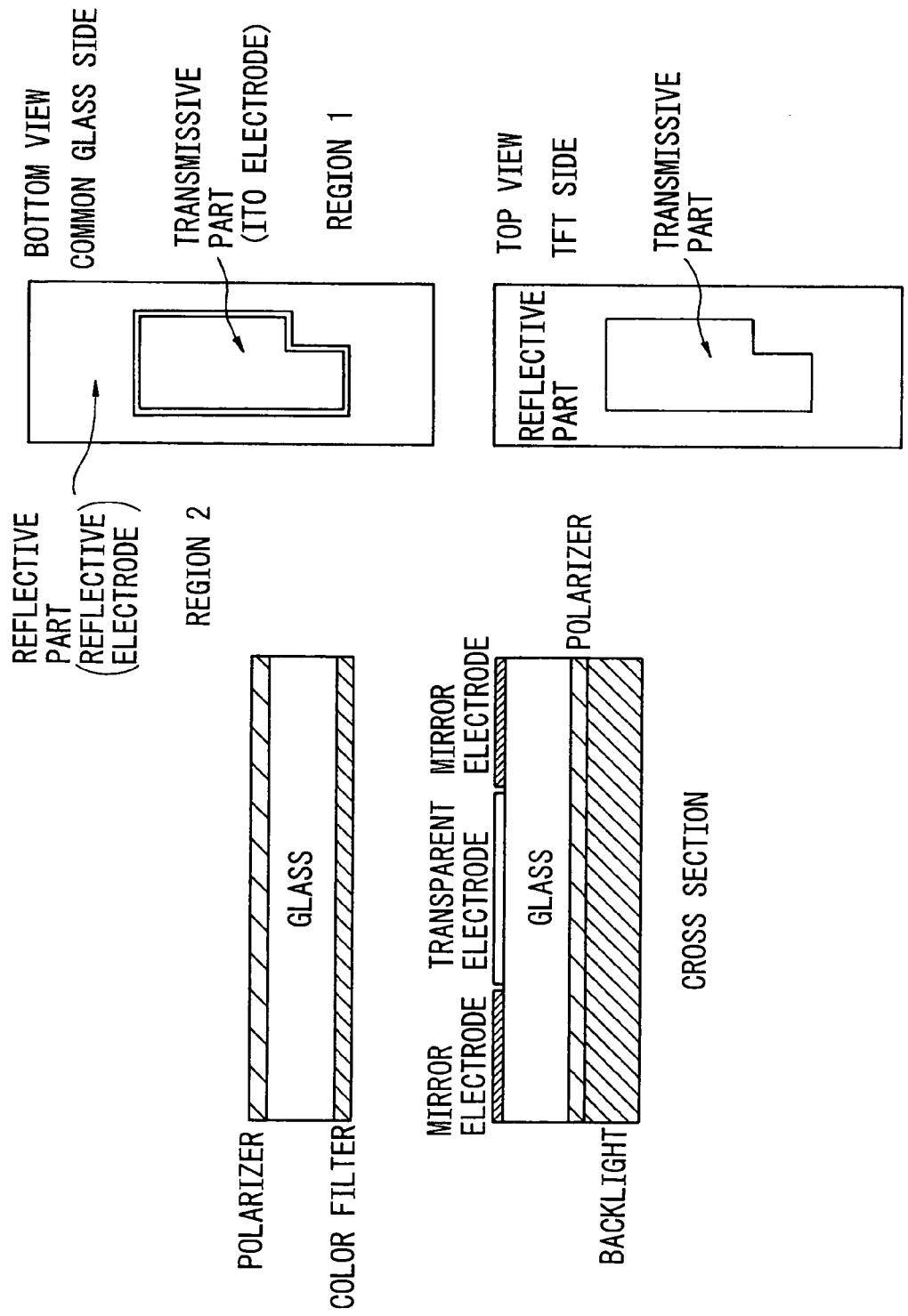
FIG. 6 is a schematic sectional view and a schematic plan view illustrating one embodiment of the structure of the transflective-type liquid crystal display device according to the present invention.

One specific embodiment of the structure of the liquid crystal display (LCD) to which the present invention has been applied is shown in FIG. 6.

In the embodiment shown in FIG. 6, unlike the conventional transflective display, for the pixels, the same cell gap (d) may be adopted. One pixel in the same gap is divided into at least two regions as shown in FIG. 6. In FIG. 6, the region 1 is a part used in transmissive display, and the region 2 is a part used in reflective display. In the embodiment shown in FIG. 6, a thin film transistor for liquid crystal material drive is common to the region 1 part and the region 2 part. On the other hand, the so-called "common electrode" on the counter side is electrically separated in the region 1 and the region 2.

Figure 7:
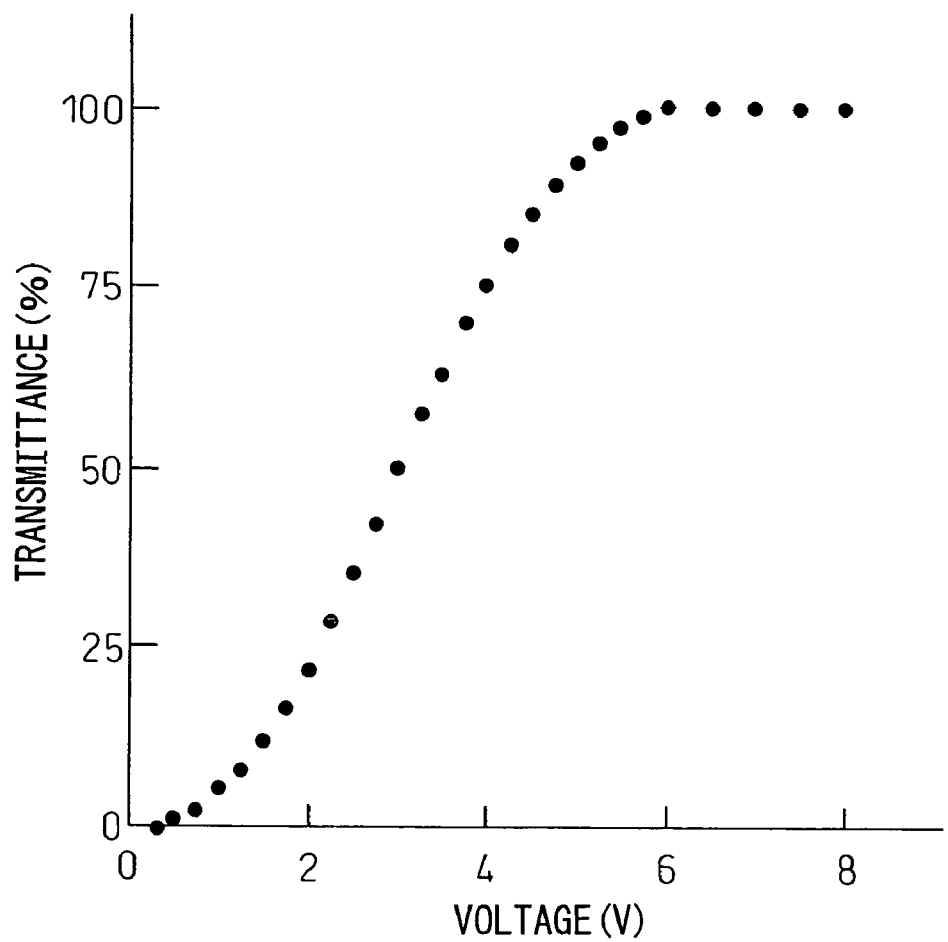
FIG. 7 is a graph illustrating one embodiment (when used as a transmission type) of the relationship between voltage and transmittance obtained by the transflective-type liquid crystal display device according to the present invention.
Figure 8:
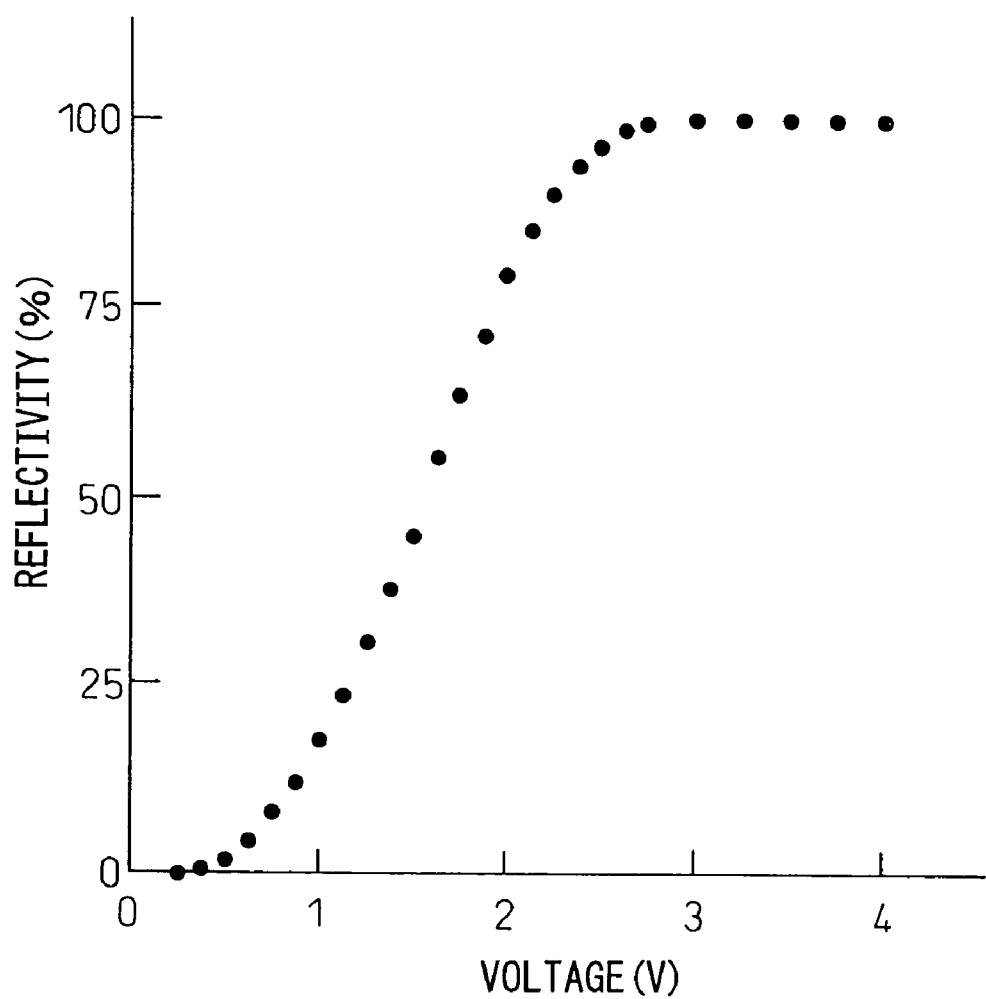
FIG. 8 is a graph illustrating one embodiment (when used as a reflection type) of the relationship between voltage and reflectance obtained by the transflective-type liquid crystal display device according to the present invention.

For use as transmissive display, only the region 1 is used, and voltage shown in FIG. 7 is applied to the region 1 to drive the liquid crystal material. On the other hand, for use as reflective display, only the region 2 is used, and the voltage shown in FIG. 8 is applied to the region 2 to drive the liquid crystal material. For use as the transmissive display, in the region 2, light from the backlight is shielded by the reflective electrode layer shown in FIG. 6, and, thus, there is no influence on display. On the other hand, for use as reflective display, in the region 1, since reflection of external light does not satisfactorily occur, the display becomes dark and substantially no influence on display occurs.

For use as transmissive display, voltage shown in FIG. 7 is applied to the liquid crystal material layer, the slant angle of the molecular optical axis of the polarization-shielded smectic liquid crystal material is specified according to the voltage, and, consequently, the quantity of light transmitted through the panel is nonambiguously decided. In this case, the maximum anisotropy (Δn) of the refractive index indicated by the liquid crystal material layer is given by voltage (5.8 V) when the applied voltage shown in FIG. 7 has reached saturated voltage. At that time, substantially no voltage is applied to the liquid crystal material in the reflective display portion (region 2 in FIG. 6) so that, even when external illumination light enters the region 2 part, the light is shielded by a polarizing plate on the outgoing light side in FIG. 6. Further, even when the reflective display portion has been driven by writing voltage in the transmissive part, the illuminance of the transmitted light is much stronger than external ambient light and the influence on transmissive display is very small and is negligible.

Figure 9:
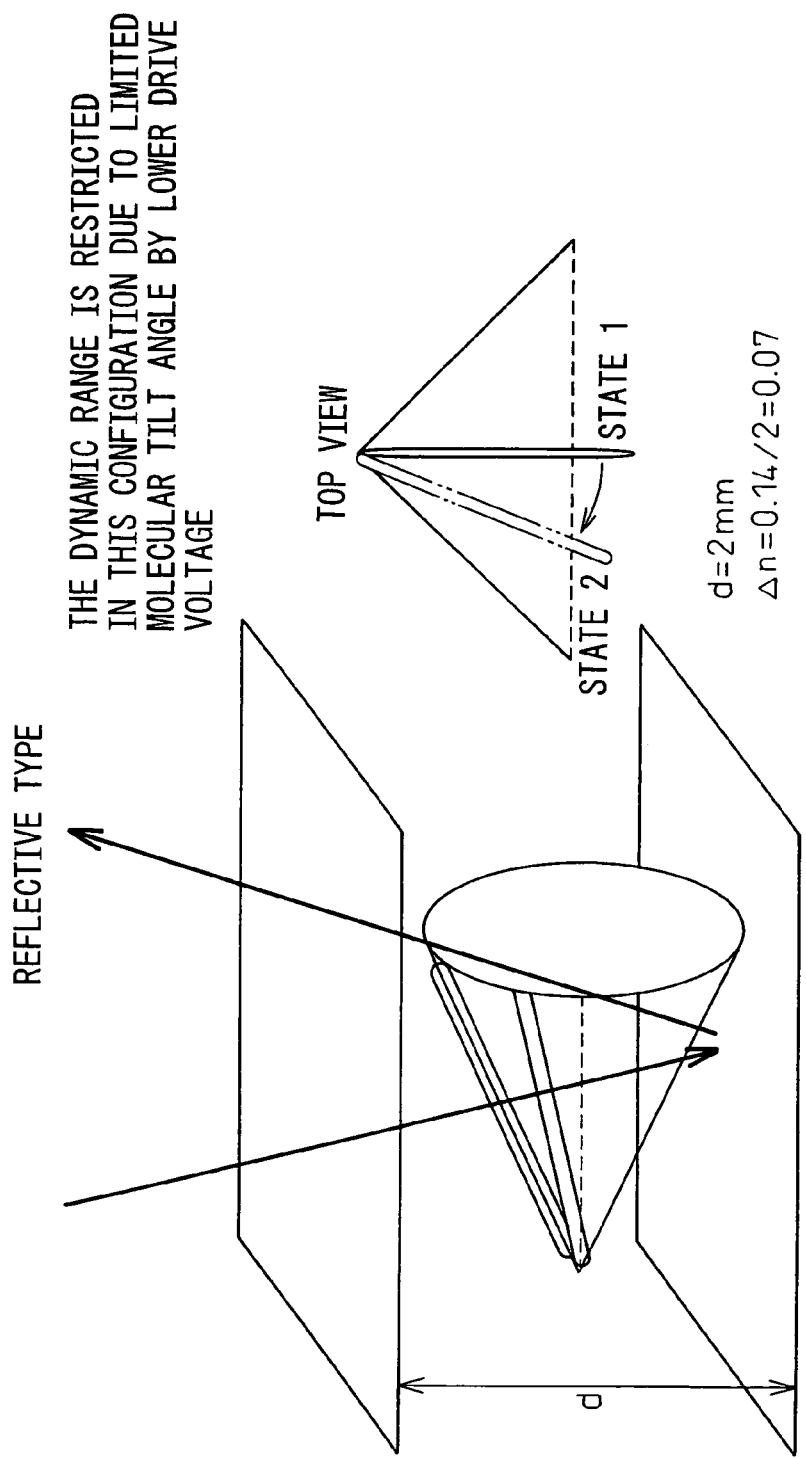
FIG. 9 is a schematic perspective view illustrating one embodiment of the principle of operation (when used as a reflection type) of the transflective-type liquid crystal display device according to the present invention.

For use as reflective display, voltage shown in FIG. 8 is applied to the liquid crystal material layer, the slant angle of the molecular optical axis of the polarization-shielded smectic liquid crystal material is specified according to the voltage, and, consequently, the quantity of light reflected from the reflective layer located on the lower part of the liquid crystal material layer is nonambiguously decided. This is shown in FIG. 9. In this case, the maximum anisotropy (Δn) of the refractive index indicated by the liquid crystal material layer is given by voltage (about 1.4 V) when the applied voltage shown in FIG. 8 has reached an about half of the saturated voltage. At that time, the voltage applied to the liquid crystal material of the transmissive display portion (region 1 in FIG. 6) is only one-fourth at the maximum of that of the case where the display is of a transmissive type, and, in most cases, the liquid crystal material layer in the region 1 does not cause a significant change in transmittance. Therefore, there is no influence on reflective display. Further, even when there is some influence on light transmittance, since external ambient light is used in reflective display, the reflection of external light is negligible in the region 1 free from the reflective layer. Therefore, influence on the display is negligible.

(Second Embodiment)

An embodiment of the present invention (second embodiment) which is the same as the first embodiment in basic concept but different from the first embodiment in pixel structure will be explained.

Figure 10:
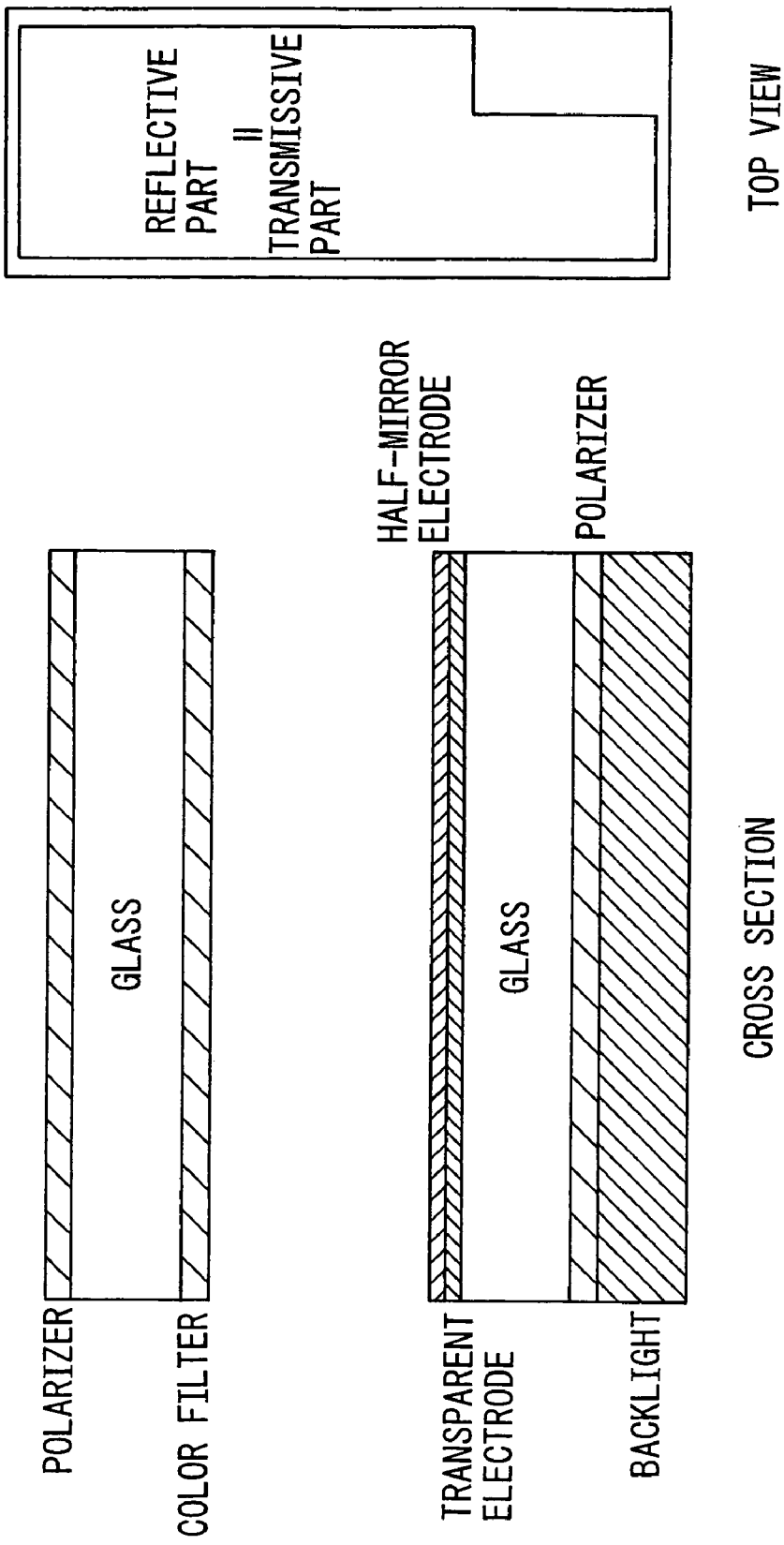
FIG. 10 is a schematic sectional view and a schematic plan view illustrating another embodiment of the structure of the transflective-type liquid crystal display device according to the present invention.

FIG. 10 shows another embodiment of the present invention which has a different pixel structure. In the pixel structure shown in FIG. 10, what is most significantly different from the structure shown in FIG. 6 is that, unlike the structure shown in FIG. 6, in the structure shown in FIG. 10, the pixel is not divided. The structure shown in FIG. 10 is characterized in that the pixel is not divided, a multilayer of a metal oxide film is provided on the lower electrode side of the pixel, backlight produced by vertical introduction from the lower part of the electrode is transmitted, and, at the same time, external ambient light is reflected from the multi-layer surface layer of metal oxide film and is not transmitted. In this structure, how to perform general transmissive display and reflective display is basically the same as described above. In general, the multi-layer metal oxide film used in this structure may be the same as an antireflective film used in the surface of camera lenses and the like. For example, a laminate film of 15 layers of $SiO_2$ and $CeO_2$ may be used. In this structure, since there is no need to divide one pixel, in particular, in the reflective display, light reflection in a wider pixel area is possible, and brighter display can be provided.

(Operation of Second Embodiment)

The operation of the device in the second embodiment will be explained.

For switching between transmissive display and reflective display in a single pixel, two basic factors should be satisfied. One of the two factors is selective control of anisotropy of the refractive index by the control of the applied voltage which is a basic principle of the present invention. The other factor is switching between transmissive display and reflective display of pixels depending upon environment illuminance. The former factor has already been explained. The concept of the latter factor will be explained below.

Figure 11:
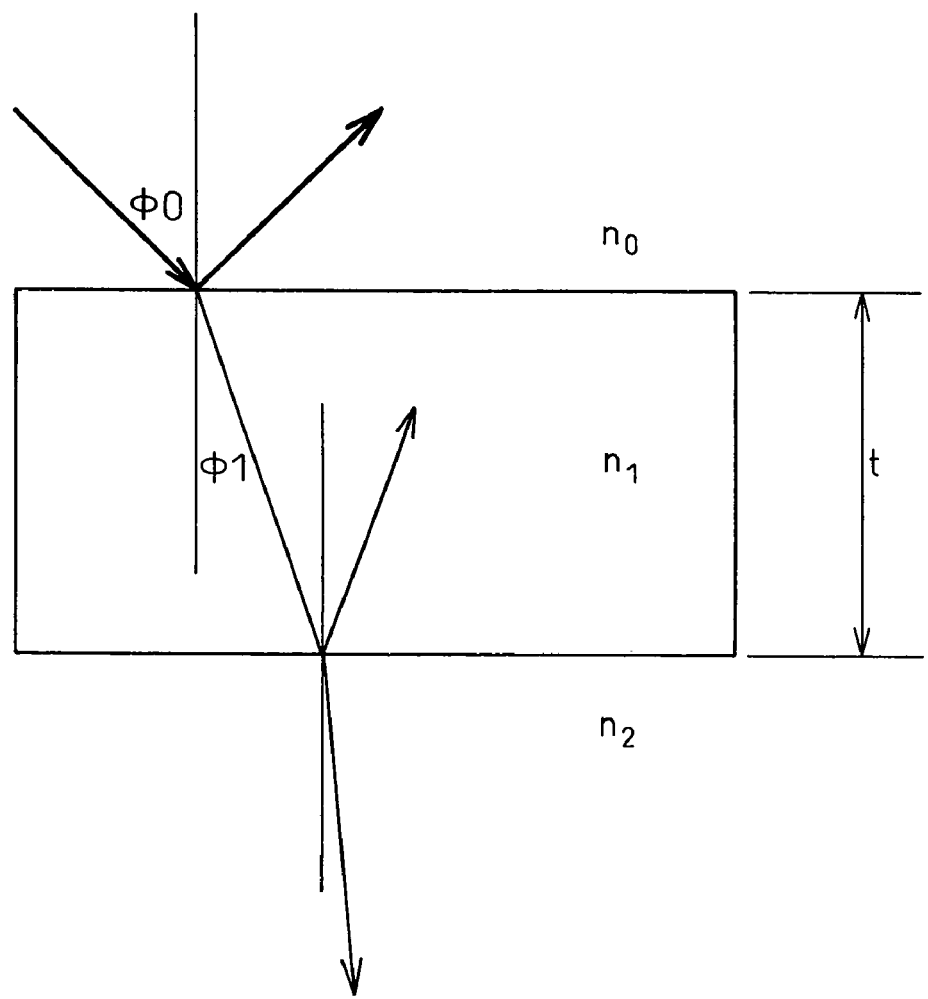
FIG. 11 is a schematic sectional view illustrating another embodiment of the principle of operation of the transflective-type liquid crystal display device according to the present invention.

In general, in the case of a film which does not absorb light (such as a metal which does not absorb visible light), light reflection coefficients $r_1$, $r_2$ and light transmission coefficients $t_1$, $t_2$ at the interface of $n_0/n_1$ or at the interface of $n_1/n_2$ shown in FIG. 11 are given by the following formulae (3) and (4) for light wherein the spectrum of the electric field is parallel to the incident light.

$$(r_1)// = (n_1 \cos \phi_0 - n_0 \cos \phi_1)/(n_1 \cos \phi_0 + n_0 \cos \phi_1) \quad (3)$$

$$(t_1)// = 2n_1 \cos \phi_1/(n_1 \cos \phi_0 + n_0 \cos \phi_1) \quad (4)$$

For light wherein the spectrum of the electric field is perpendicular to the incident light, they are given by the following formulae (5) and (6).

$$(r_1)\perp = (n_1 \cos \phi_1 - n_0 \cos \phi_0)/(n_1 \cos \phi_1 + n_0 \cos \phi_0) \quad (5)$$

$$(t_1)\perp = 2n_1 \cos \phi_1/(n_1 \cos \phi_1 + n_0 \cos \phi_0) \quad (6)$$

The above formulae (3) to (6) give Fresnel coefficient of the component parallel to the incident face of reflected light (r) and transmitted light (t) and the component perpendicular to the incident face of reflected light (r) and transmitted light (t). From these formulae, when reflected light and transmitted light are added by taking into consideration a phase change in the film ($\delta_1 = 2\pi \nu n_1 t \cos \phi$ where $\nu$ represents the wavelength of light, t represents film thickness and the like), the intensity R and T (energy) of the reflected light and the transmitted light are determined as follows. In this connection, however, it should be noted that, in the following two formulae, formulae (7) and (8), the film is assumed to be isotropic.

$$R = (r_1^2 + 2r_1 r_2 \cos 2\delta_1 + r_2^2)/(1 + 2r_1 r_2 \cos 2\delta_1 + r_1^2 r_2^2) \quad (7)$$

$$T = (n_2 t_1^2 t_2^2)/\{n_0(1 + 2r_1 r_2 \cos 2\delta_1 + r_1^2 r_2^2)\} \quad (8)$$

From formulae (7) and (8), it is found that a reflectance of about 100% and a transmittance of about 100% can be provided for a certain wavelength (a wavelength region) by multilayering films having certain thickness and the refractive index. In fact, transflective and semireflective films called "magic mirror" are commercially placed on the market in the form of a laminate of metal oxide film of $SiO_2$, $CeO_2$, $MgF_2$ and the like according to the formulae (7) and (8). The so-called "magic mirror" functions as a reflective film when the front face side relative to a mirror plane has higher illuminance than the rear face of the mirror. On the other hand, when the front face side of the mirror is darker than the rear side of the mirror, the magic mirror functions as a transmissive film.

Accordingly, when the multi-layer film based on the above concept is disposed at the lower part (or upper part: see FIG. 10) of the transparent electrode, switching between transmissive display and reflective display of the pixel depending upon environment illuminance is possible and transflective display in a single pixel and a single panel gap can be provided.

Hereinbelow, the present invention will be described in more detail with reference to specific Examples.

EXAMPLES

Example 1

Figure 12:
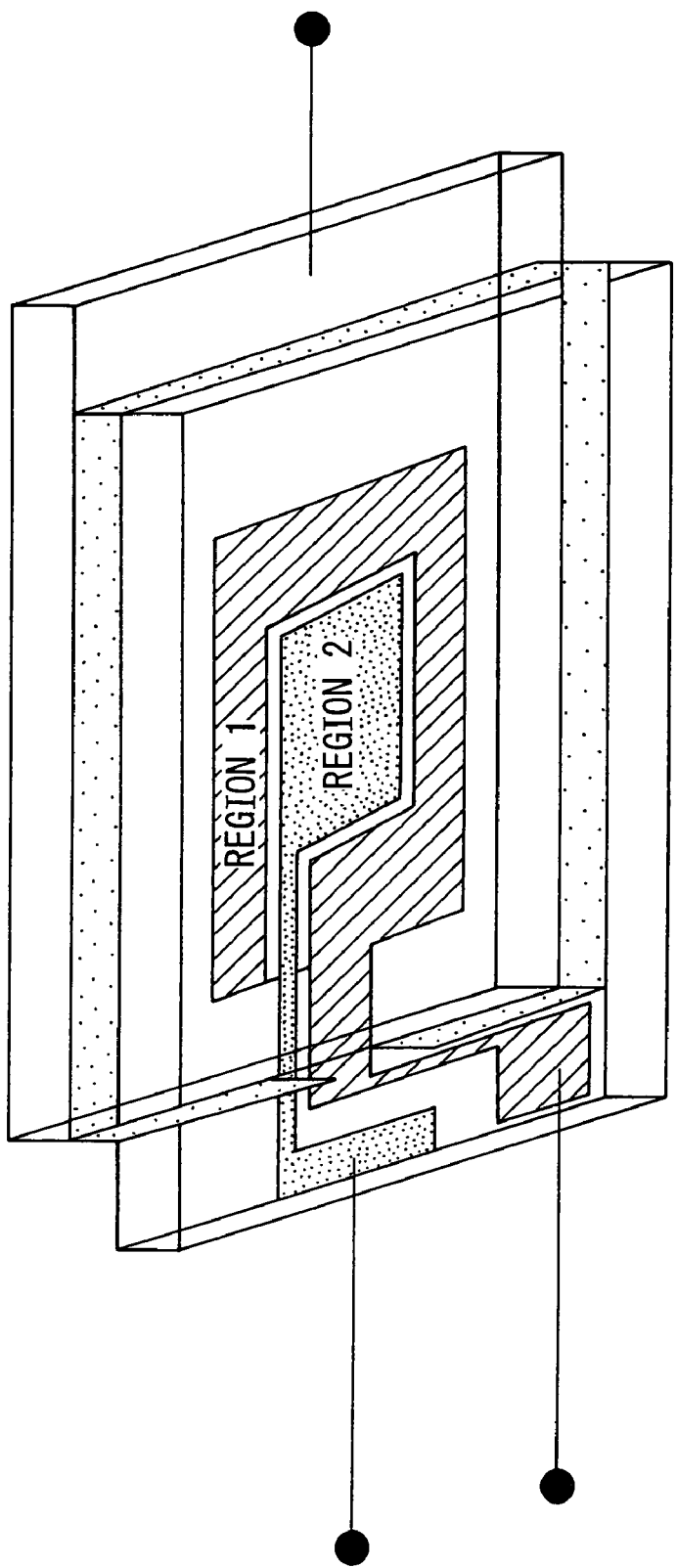
FIG. 12 is a schematic perspective view illustrating an embodiment of the structure of the transflective-type liquid crystal display device according to the present invention prepared in a Example.

In order to demonstrate the concept of the present invention, a glass substrate having a size of 35 mm×35 mm×0.7 mm was provided, and, as shown in FIG. 12, a transparent electrode (ITO) was patterned to provide a display region 1 and a display region 2. In the display region 1, ITO as such was used. On the other hand, in the display region 2, aluminum was vapor deposited on ITO, and the assembly was used as the reflective electrode. On the counter side, a nonpatterned glass with ITO electrode as a common electrode glass was used. The size of the glass on the counter side was the same as the size of the patterned glass substrate, and they were laminated to each other as shown in FIG. 12. The two glass substrates were placed so as to face each other, and a silica spacer having a particle diameter of 1.8 μm was used for providing a given size of a gap (the above-described d) in the liquid crystal material layer. A polyimide was coated onto the surface of two glass substrates, and the coating was baked. Thereafter, rubbing was carried out in mutual parallel direction. Thereafter, the above spacer dispersed in ethanol was dispersed in an amount of 50 particles per mm$^2$. A two-component epoxy resin was then filled into a part around this glass to prepare an empty cell. A the polarization-shielded smectic liquid crystal material was poured into this cell to prepare PSS-LCD.

As shown in FIG. 12, an electrode was attached by ultrasonic soldering and was connected to a power supply. The average cell gap of the liquid crystal material panel prepared above was measured by taking advantage of repeated reflection interference and was found to be 2.0 μm. The anisotropy of the refractive index of the poured liquid crystal material at 560 nm is 0.14. A photoviewer comprising a white light source and a light diffusing film was used as a transmission light source. The brightness on the diffusing plate of the photoviewer used was 1,800 nit. A fluorescent lamp mounted on a usual room ceiling was used as a reflection display. At that time, the illuminance on the liquid crystal material panel face in this Example was 3,000 lux.

Figure 13:
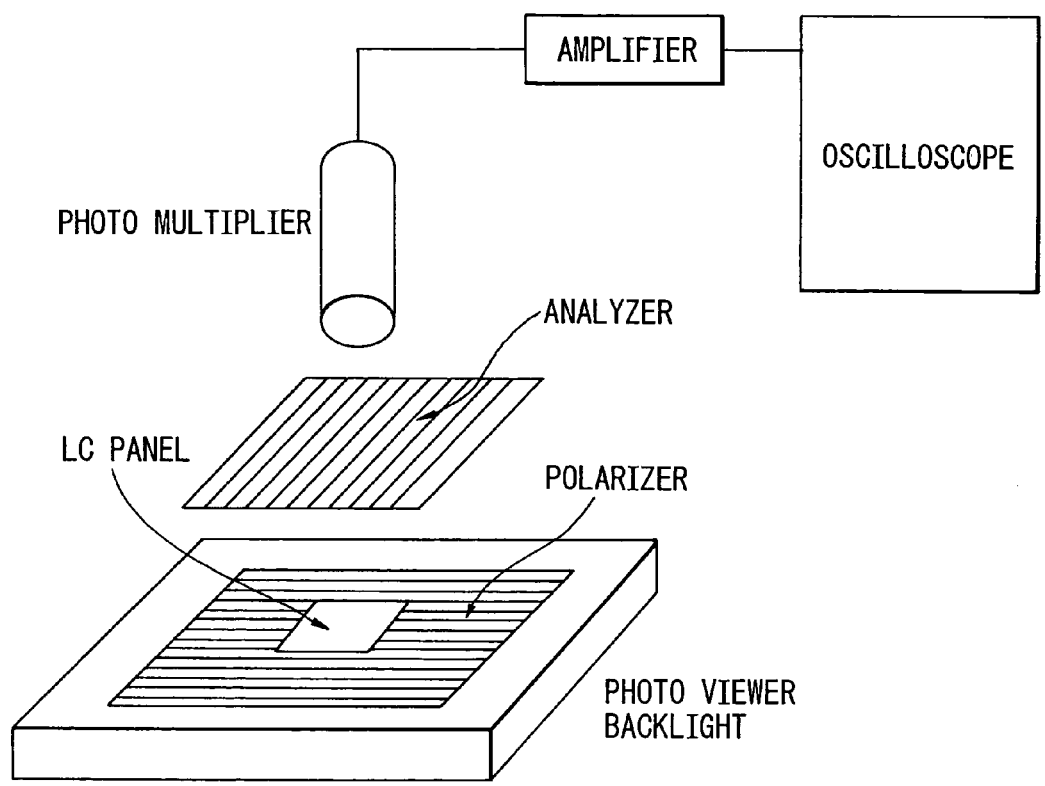
FIG. 13 is a schematic perspective view illustrating an embodiment of setup for operating the transflective-type liquid crystal display device according to the present invention which has been prepared in an Example appearing hereinafter.
Figure 14:
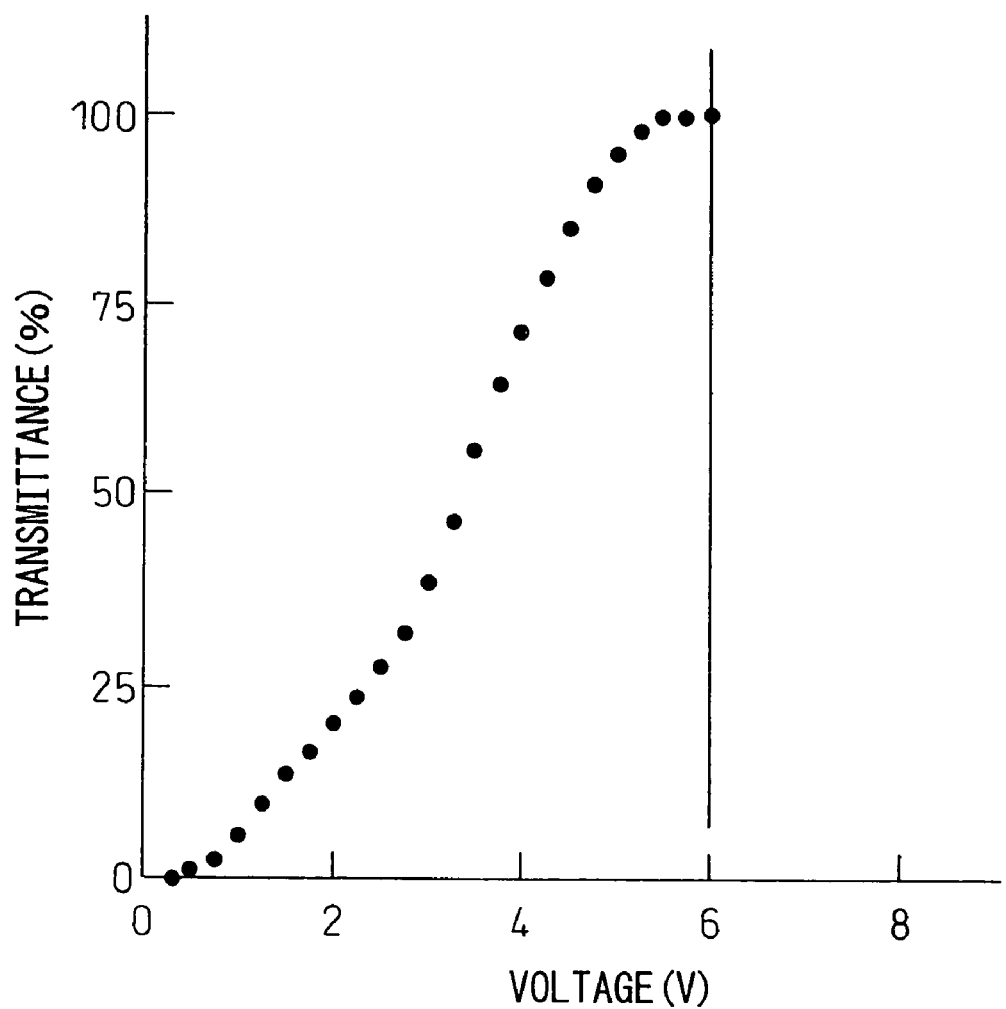
FIG. 14 is a graph illustrating one embodiment (when used as a transmission type) of the relationship between voltage and transmittance obtained by the transflective-type liquid crystal display device according to the present invention which has been prepared in an Example appearing hereinafter.

In the display region 1, in order to perform transmission display, the maximum applied voltage was brought to 6 V to determine a continuous change in the intensity of transmitted light depending upon the intensity of an applied electric field. The intensity of transmitted light depending upon the intensity of applied voltage was measured by detecting the intensity of transmitted light with a photomultiplier under a setup as shown in FIG. 13. The results of the measurement are shown in FIG. 14. At that time, the display of the transmitted light was achromatic color display which ranged from white, which was the same as that in the photoviewer used as the transmission light source, to black. In the display region 2, in order to perform reflection display, the maximum applied voltage was brought to 3 V to determine a continuous change in the intensity of reflected light depending upon the intensity of an applied electric field.

Figure 15:
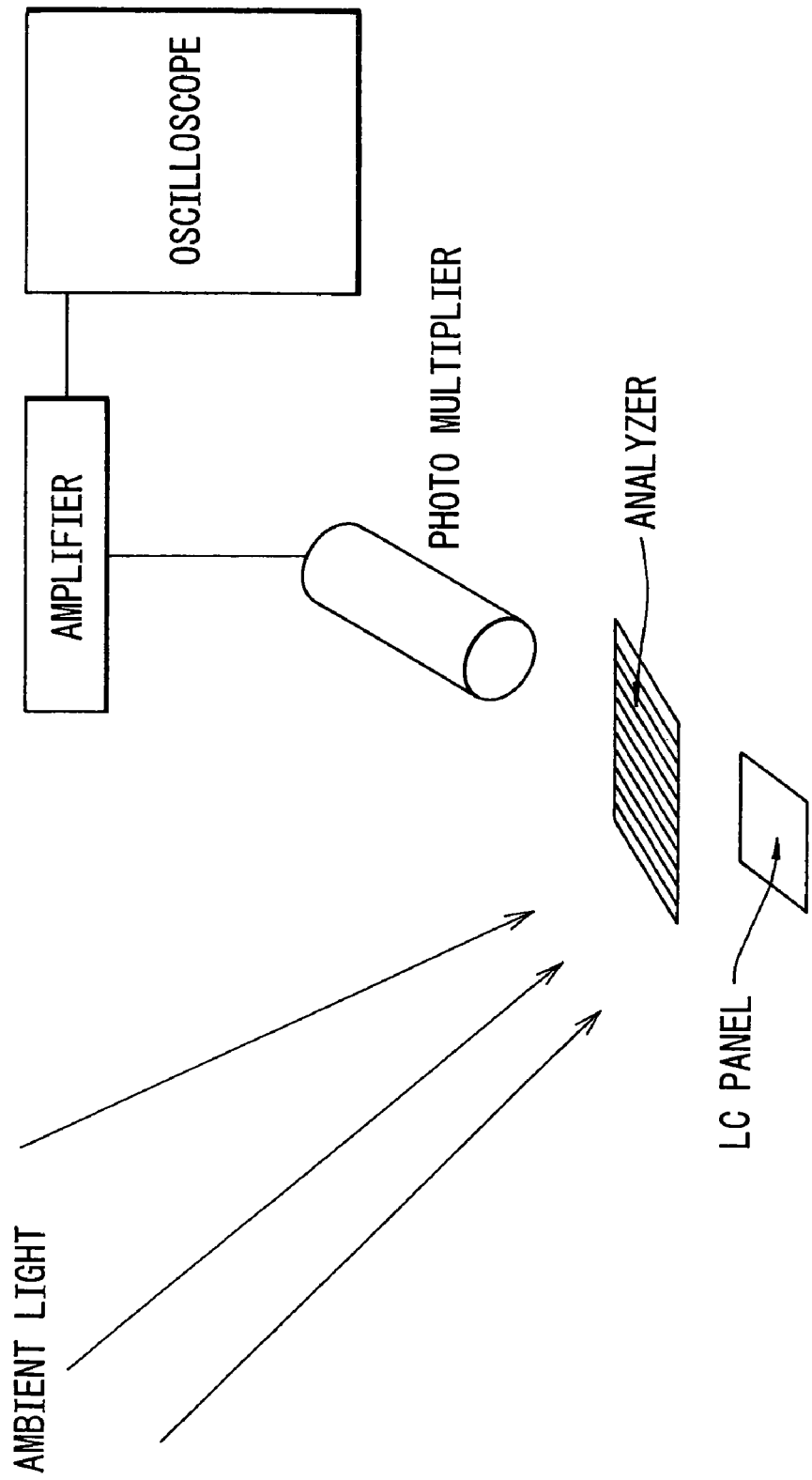
FIG. 15 is a schematic perspective view illustrating an embodiment of setup (when used as a reflection type) for operating the transflective-type liquid crystal display device according to the present invention which has been prepared in an Example appearing hereinafter.
Figure 16:
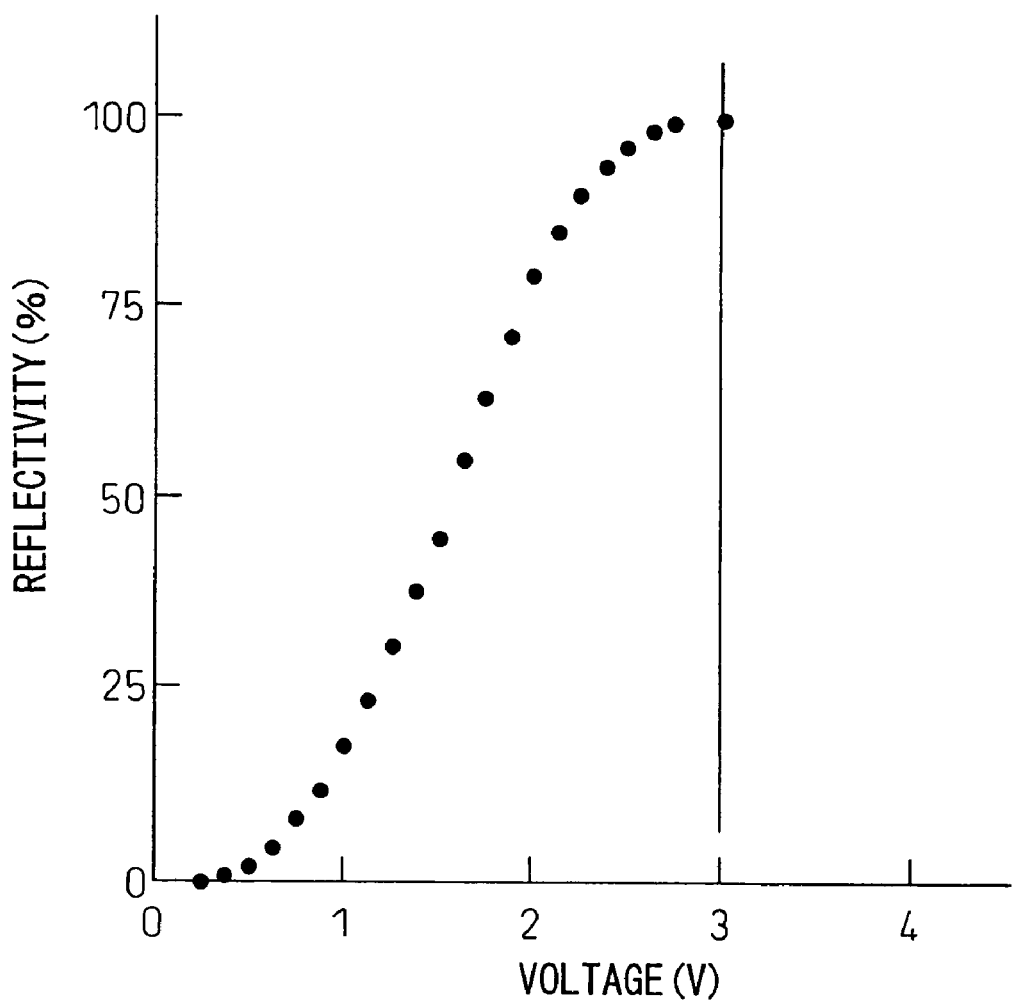
FIG. 16 is a graph illustrating one embodiment (when used as a reflection type) of the relationship between voltage and reflectance obtained by the transflective-type liquid crystal display device according to the present invention.

The intensity of reflected light depending upon the intensity of applied voltage was measured by detecting the intensity of reflected light with a photomultiplier under a setup as shown in FIG. 15. The results of the measurement are shown in FIG. 16. At that time, the display of the reflected light was achromatic color display which ranged from white, which was the same as that in a fluorescent lamp in the ceiling as environment light, to black.

As is found from the results of the measurement as shown in FIGS. 14 and 16, it was confirmed that, within the same pixel, both transmission display and reflection display were possible in a continuous tone without coloring by simply varying applied voltage through a single panel gap.

Example 2

In order to demonstrate color display function according to the present invention, in the same manner as in Example 1, a glass substrate having a size of 35 mm×35 mm×0.7 mm was provided, and, as shown in FIG. 12, a transparent electrode (ITO) was patterned to provide a display region 1 and a display region 2. In the display region 1, ITO as such was used. On the other hand, in the display region 2, aluminum was vapor deposited on ITO, and the assembly was used as the reflective electrode. On the counter side, glass comprising a nonpatterned ITO electrode and, provided on the ITO electrode, a color filter comprising an acrylic base polymer impregnated with a red coloring matter was used. Similarly, on a separate counter glass substrate, a blue color filter and a green color filter were separately provided on ITO. The size of the glass on the counter side was the same as the size of the patterned glass substrate, and they were laminated to each other as shown in FIG. 12. The two glass substrates were placed so as to face each other, and a silica spacer having a particle diameter of 1.8 μm was used for providing a given size of a gap (the above-described d) in the liquid crystal material layer. A polyimide was coated onto the surface of two glass substrates, and the coating was baked. Thereafter, rubbing was carried out in mutual parallel direction. Thereafter, the above spacer dispersed in ethanol was dispersed in an amount of 50 particles per mm$^2$. A two-component epoxy resin was then filled into a part around this glass to prepare an empty cell. A the polarization-shielded smectic liquid crystal material was poured into this cell to prepare PSS-LCD.

As shown in FIG. 12, an electrode was attached by ultrasonic soldering and was connected to a power supply. The average cell gap of the liquid crystal material panel prepared above was measured by taking advantage of repeated reflection interference and was found to be 2.0 μm. The anisotropy of the refractive index of the poured liquid crystal material at 560 nm is 0.14. A photoviewer comprising a white light source and a light diffusing film was used as a transmission light source. The brightness on the diffusing plate of the photoviewer used was 1,800 nit. A fluorescent lamp mounted on a usual room ceiling was used as a reflection display. At that time, the illuminance on the liquid crystal material panel face in this Example was 3,000 lux.

Figure 17:
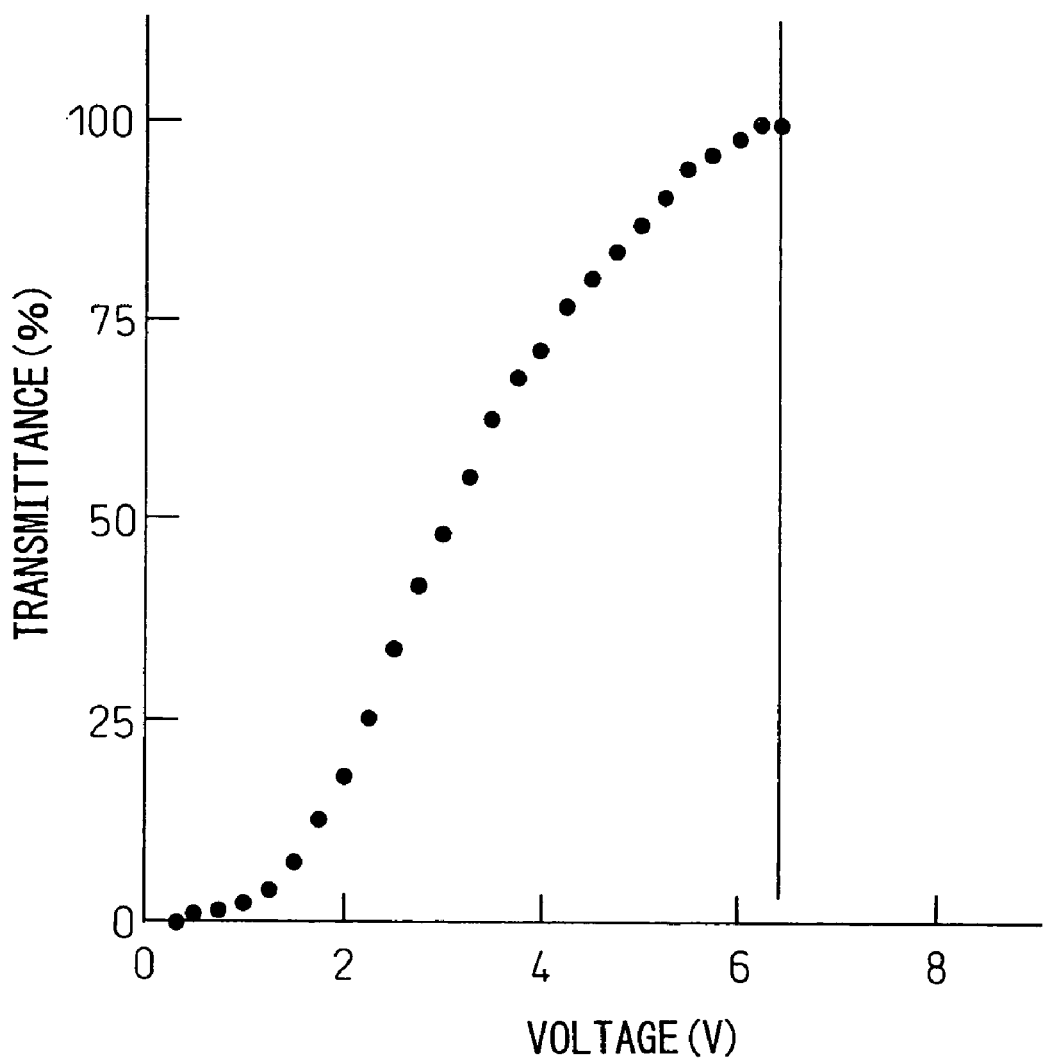
FIG. 17 is a graph illustrating one embodiment (when used as a transmission type) of the relationship between voltage and transmittance obtained by the transflective-type liquid crystal display device according to the present invention which has been prepared in an Example appearing hereinafter.

In the display region 1, in order to perform transmission display, the maximum applied voltage was brought to 6.3 V to determine a continuous change in the intensity of transmitted light depending upon the intensity of an applied electric field. The intensity of transmitted light depending upon the intensity of applied voltage was measured by detecting the intensity of transmitted light with a photomultiplier under a setup as shown in FIG. 13. The results of the measurement are shown in FIG. 17. At that time, the transmitted light was such that, regarding white photoviewer light used as a transmissive light source, continuous tone color display was obtained for red, blue, and green colors by respective color filters. In the display region 2, in order to perform reflection display, the maximum applied voltage was brought to 3.2 V to determine a continuous change in the intensity of reflected light depending upon the intensity of an applied electric field.

Figure 18:
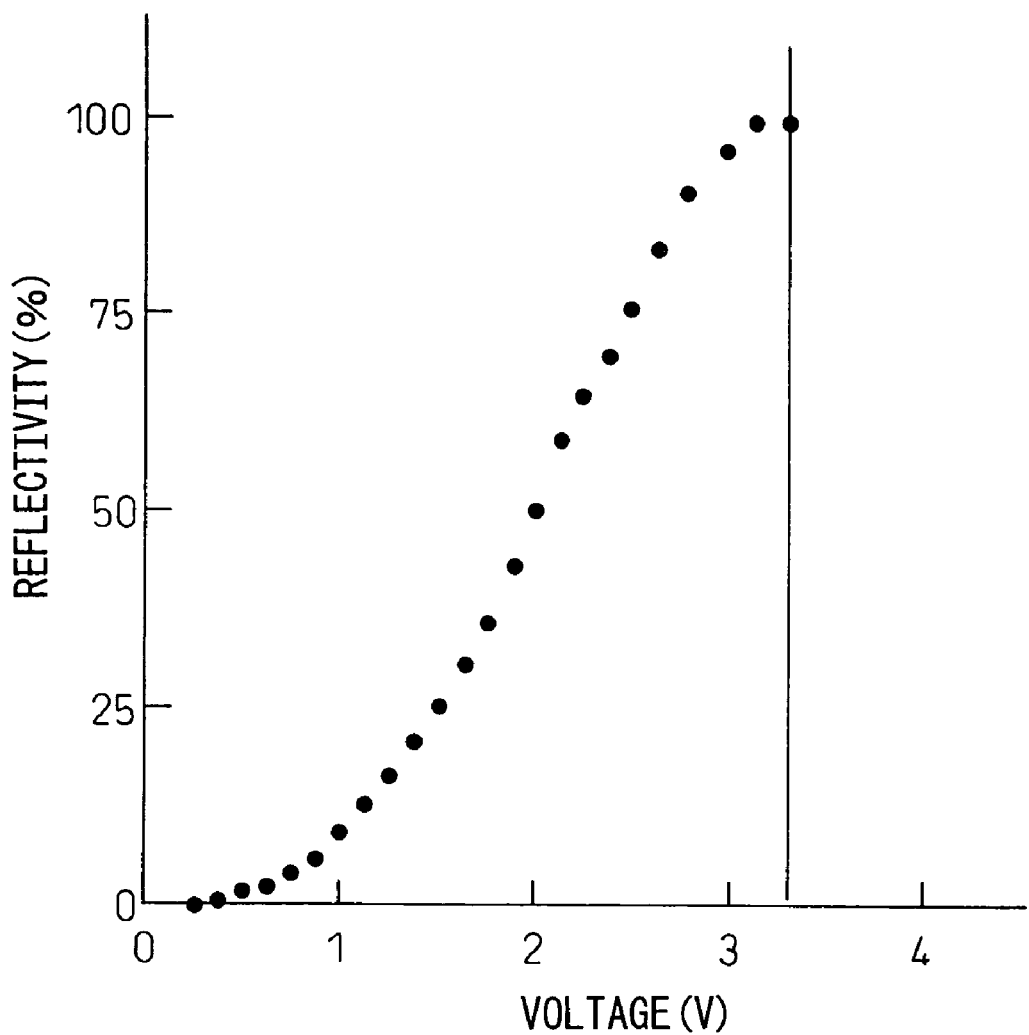
FIG. 18 is a graph illustrating one embodiment (when used as a reflection type) of the relationship between voltage and reflectance obtained by the transflective-type liquid crystal display device according to the present invention.

The intensity of reflected light depending upon the intensity of applied voltage was measured by detecting the intensity of reflected light with a photomultiplier under a setup as shown in FIG. 15. The results of the measurement are shown in FIG. 18. At that time, reflected light was such that, regarding a white ceiling fluorescent lamp as environment light, continuous tone color display was obtained for red, blue, and green colors by respective color filters.

As is found from the results of the measurement as shown in FIGS. 17 and 18, it was confirmed that, within the same pixel, both transmission display and reflection display were possible in a continuous tone by simply varying applied voltage through a single panel gap.

Example 3

In order to demonstrate the function of a different structure according to the present invention, a glass substrate having a size of 35 mm×35 mm×0.7 mm was provided, and, as shown in FIG. 12, a transparent electrode (ITO) was patterned. Further, regarding one of the substrates, a multilayer film was formed on ITO by stacking $SiO_2$ and $CeO_2$ to provide a transflective film. On the substrate on the counter side, a nonpatterned glass with ITO electrode as a common electrode glass was used. The size of the glass on the counter side was the same as the size of the patterned glass substrate, and they were laminated to each other as shown in FIG. 12. The two glass substrates were placed so as to face each other, and a silica spacer having a particle diameter of 1.8 µm was used for providing a given size of a gap (the above-described d) in the liquid crystal material layer. A polyimide was coated onto the surface of two glass substrates, and the coating was baked. Thereafter, rubbing was carried out in mutual parallel direction. Thereafter, the above spacer dispersed in ethanol was dispersed in an amount of 50 particles per $mm^2$. A two-component epoxy resin was then filled into a part around this glass to prepare an empty cell. A the polarization-shielded smectic liquid crystal material was poured into this cell to prepare PSS-LCD. As shown in FIG. 12, an electrode was attached by ultrasonic soldering and was connected to a power supply. The average cell gap of the liquid crystal material panel prepared above was measured by taking advantage of repeated reflection interference and was found to be 2.0 µm. The anisotropy of the refractive index of the poured liquid crystal material at 560 nm is 0.14. A photoviewer comprising a white light source and a light diffusing film was used as a transmission light source. The brightness on the diffusing plate of the photoviewer used was 1,800 nit. A fluorescent lamp mounted on a usual room ceiling was used as a reflection display. At that time, the illuminance on the liquid crystal material panel face in this Example was 3,000 lux.

Figure 19:
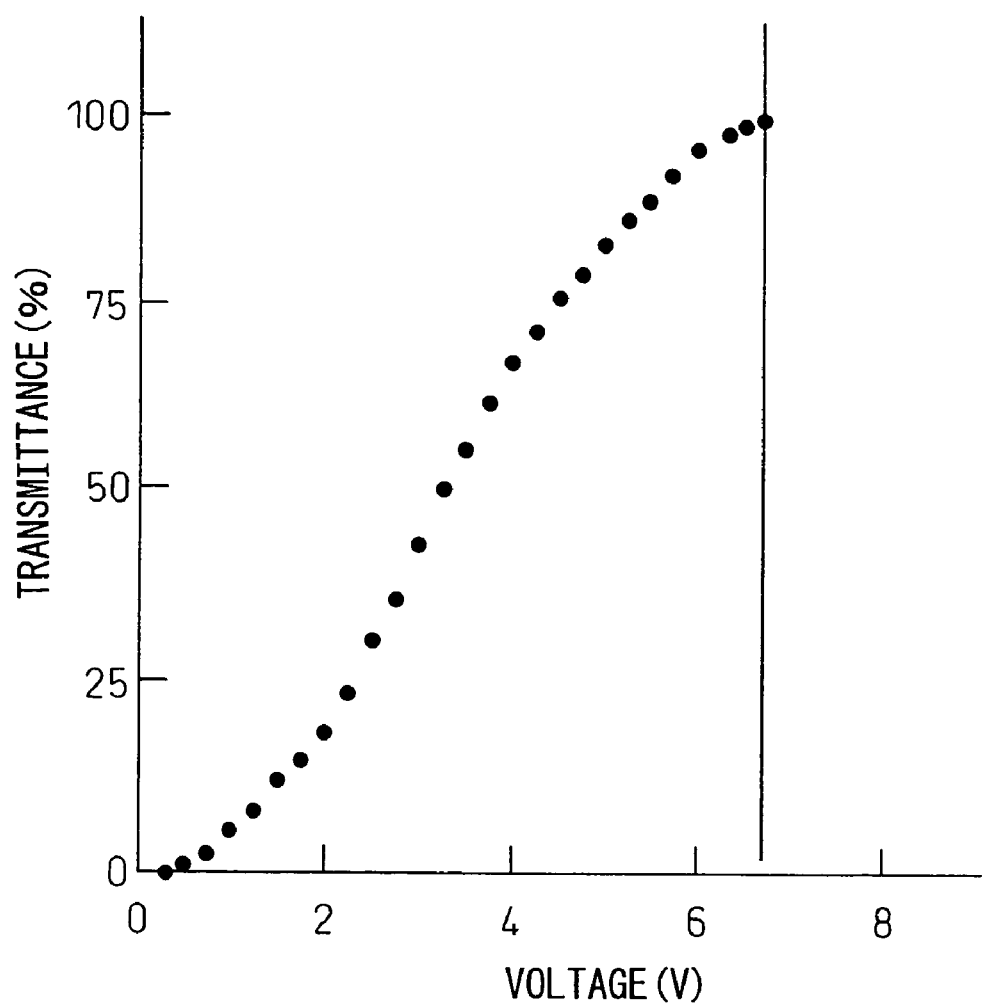
FIG. 19 is a graph illustrating one embodiment (when used as a transmission type) of the relationship between voltage and transmittance obtained by the transflective-type liquid crystal display device according to the present invention which has been prepared in an Example appearing hereinafter.

In order to perform transmissive display, the above photoviewer light source was used, and the maximum voltage applied to the liquid crystal material panel was brought to 6.5 V to determine a continuous change in intensity of transmitted light depending upon the intensity of an applied electric field. The intensity of transmitted light depending upon the intensity of applied voltage was measured by detecting the intensity of transmitted light with a photomultiplier under a setup as shown in FIG. 13. The results of the measurement are shown in FIG. 19. At that time, the display of the transmitted light was achromatic color display which ranged from white, which was the same as that in the photoviewer used as the transmission light source, to black.

Figure 20:
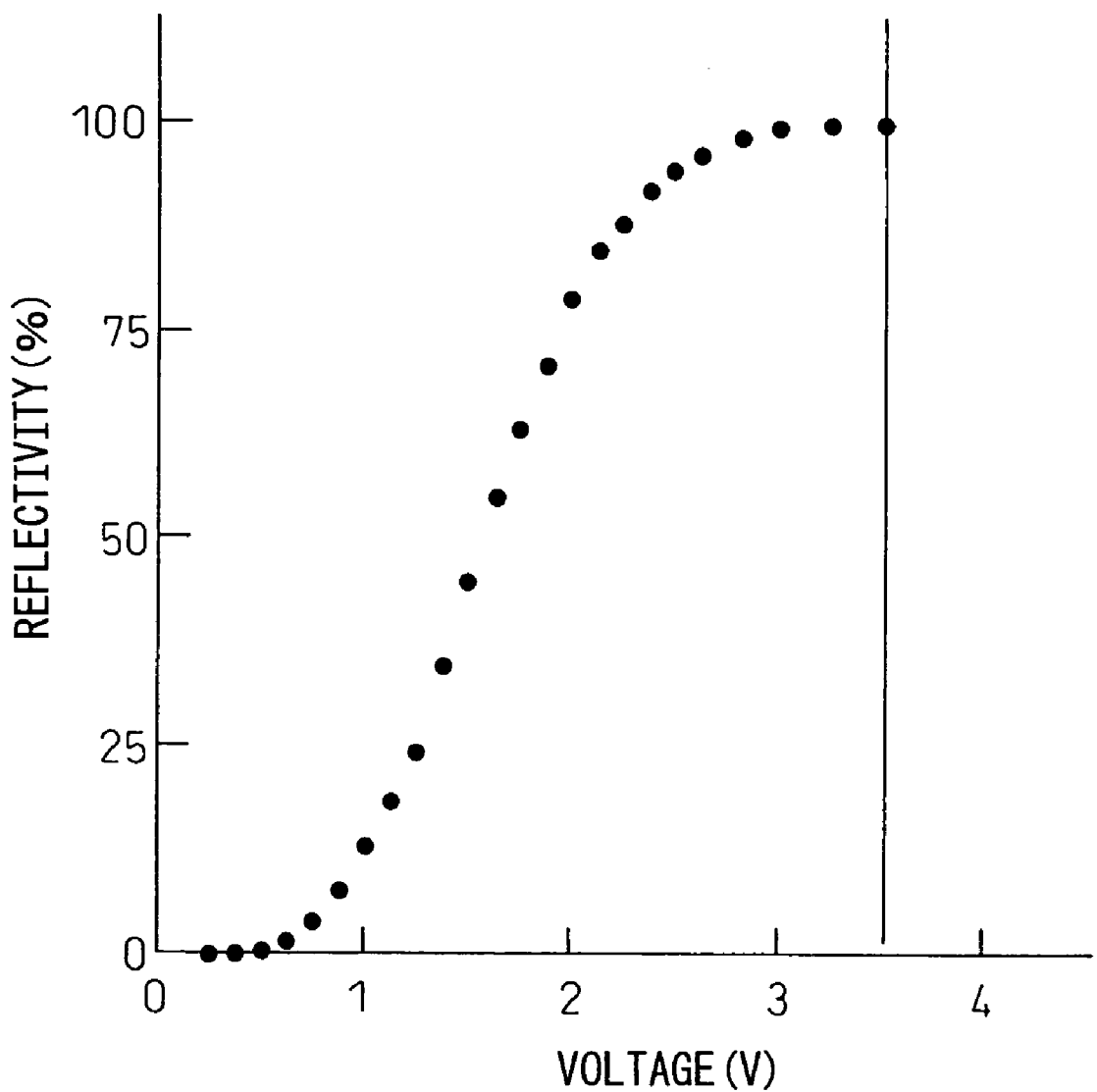
FIG. 20 is a graph illustrating one embodiment (when used as a reflection type) of the relationship between voltage and reflectance obtained by the transflective-type liquid crystal display device according to the present invention.

In order to perform reflective display, the light source of the above photoviewer was shut off, and, under indoor environment illuminance, the maximum applied voltage was brought to 3.5 V to determine a continuous change in the intensity of reflected light depending upon the intensity of an applied electric field. The intensity of reflected light depending upon the intensity of applied voltage was measured by detecting the intensity of reflected light with a photomultiplier under a setup as shown in FIG. 15. The results of the measurement are shown in FIG. 20. At that time, the display of the reflected light was achromatic color display which ranged from white, which was the same as that in a fluorescent lamp in the ceiling as environment light, to black.

As is found from the results of the measurement as shown in FIGS. 19 and 20, it was confirmed that, in a single panel gap and the same pixel, both transmission display and reflection display were possible in a continuous tone within the same pixel without coloring by simply varying applied voltage.

From the invention thus described, it will be obvious that the invention may be changed in many ways. Such variations are not to be regarded as a departure from the spirit and scope of the invention, and all such modifications as would be obvious to one skilled in the art are intended to be included within the scope of the following claims.

What is claimed is:

1. A transflective-type liquid crystal display device, comprising, at least, a pair of substrates, and a liquid crystal material disposed between the pair of substrates,
wherein the liquid crystal material is a polarization-shielded smectic liquid crystal material capable of providing a tunable birefringence system wherein the magnitude of anisotropy of the refractive index of the liquid crystal layer can be regulated by the intensity of an electric field to be applied to the liquid crystal layer.

2. A liquid crystal display device according to claim 1, which is capable of providing a transmissive display and a reflective display in the same device using a single panel gap.

3. A liquid crystal display device according to claim 1, wherein each pixel has a single panel gap in the case of the transmissive display and in the case of the reflective display.

4. A liquid crystal display device according to claim 1, which uses a liquid crystal having the same initial alignment in the case of the transmissive display and in the case of the reflective display.

5. A liquid crystal display device according to claim 1, wherein the voltage applied to the liquid crystal material layer in the case of the transmissive display is different from that in the case of the reflective display.

6. A liquid crystal display device according to claim 1, which uses a polarization-shielded smectic liquid crystal material having the same initial alignment in the case of the transmissive display and in the case of the reflective display.

7. A liquid crystal display device according to claim 2, which uses a single panel gap, is capable of selecting the transmissive display or the reflective display by increasing or decreasing the voltage applied to the liquid crystal layer.

8. A liquid crystal display device according to claim 2, wherein, within the same pixel, an effective display portion used in the case of the transmissive display is different from an effective display portion used in the case of the reflective display, and a reflective layer comprising a multi-layer laminate film of a metal oxide is provided in the reflective display portion.

* * * * *